US006427879B1

(12) United States Patent
Caldwell

(10) Patent No.: US 6,427,879 B1
(45) Date of Patent: Aug. 6, 2002

(54) MEASURING AND DISPENSING DEVICE

(76) Inventor: John W. Caldwell, 1 Orchard La. North, Wallingford, PA (US) 19086

( * ) Notice: Subject to any disclaimer, the term of this patent is extended or adjusted under 35 U.S.C. 154(b) by 0 days.

(21) Appl. No.: 09/449,296

(22) Filed: Nov. 24, 1999

(51) Int. Cl.$^7$ ............................................. A47G 19/14
(52) U.S. Cl. .................... 222/465.1; 222/158; 222/566; 222/572; 73/426
(58) Field of Search .............................. 222/158, 465.1, 222/566, 572; 73/426, 427

(56) References Cited

U.S. PATENT DOCUMENTS

| | | | | |
|---|---|---|---|---|
| 93,734 A | * | 8/1869 | Morahan ..................... 222/572 |
| 157,222 A | * | 11/1874 | Redgrave ..................... 73/427 |
| 169,046 A | * | 10/1875 | Schmitz .................... 222/465.1 |
| 257,421 A | * | 5/1882 | Weber ........................ 73/426 |
| 269,909 A | * | 1/1883 | Armstrong ............... 222/465.1 |
| 325,842 A | * | 9/1885 | Knapp ........................ 222/566 |
| 343,908 A | * | 6/1886 | Lagerquist .................. 222/566 |
| 463,335 A | * | 11/1891 | Mulford ...................... 366/283 |
| 497,940 A | * | 5/1893 | Bacon, Jr. .................... 220/703 |
| 923,618 A | * | 6/1909 | Blizard ........................ 73/427 |
| 1,708,416 A | * | 4/1929 | Herburger ................... 222/566 |
| 1,718,897 A | * | 6/1929 | Dunbar et al. ............. 222/158 |
| 2,030,975 A | * | 2/1936 | Fairchild ....................... 73/62 |
| D99,405 S | * | 4/1936 | Marschall ................. D10/46.3 |
| 3,530,722 A | * | 9/1970 | Miller ......................... 73/427 |
| 4,230,238 A | * | 10/1980 | Wilson ....................... 222/158 |
| 5,645,191 A | * | 7/1997 | Neville ....................... 220/717 |

* cited by examiner

Primary Examiner—Henry C. Yuen
Assistant Examiner—Frederick C Nicolas
(74) Attorney, Agent, or Firm—Woodcock Washburn LLP

(57) ABSTRACT

Containers having improved ability to deliver materials, especially comestibles into restricted containers are provided. Such containers, preferably of the type normally denominated as "measuring cups" preferably comprise elongated snouts projecting upwardly and outwardly from their top and side surfaces so as to facilitate such transfer.

7 Claims, 1 Drawing Sheet

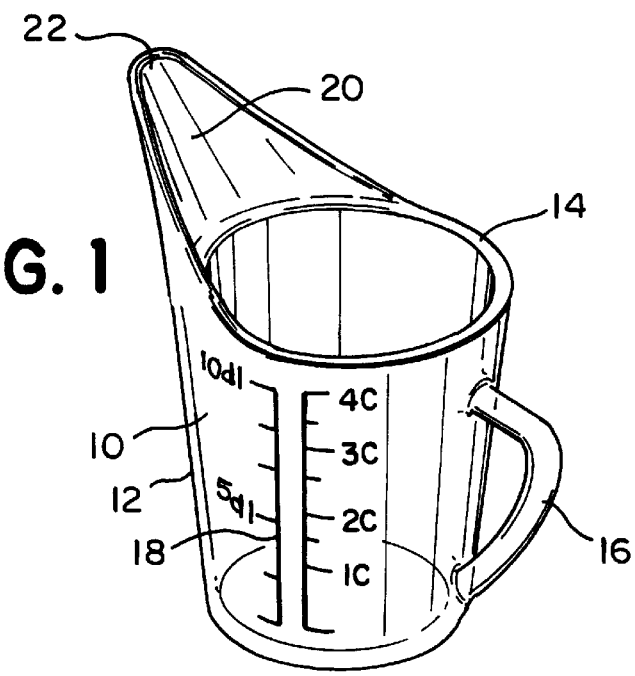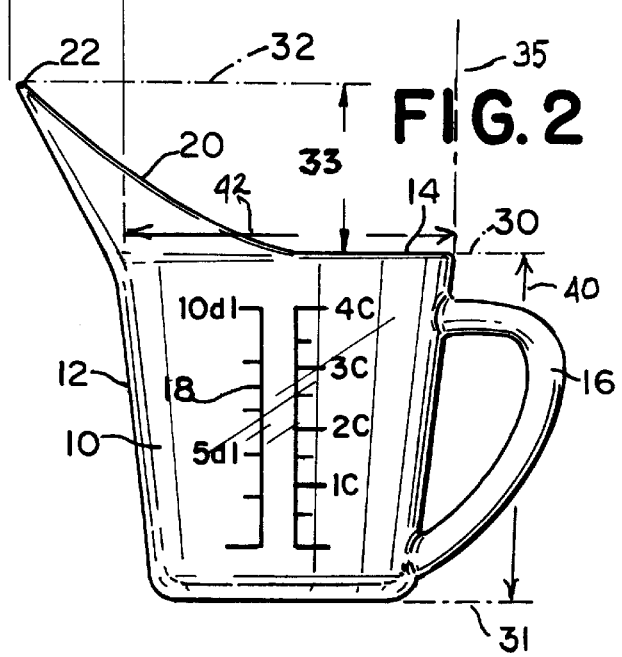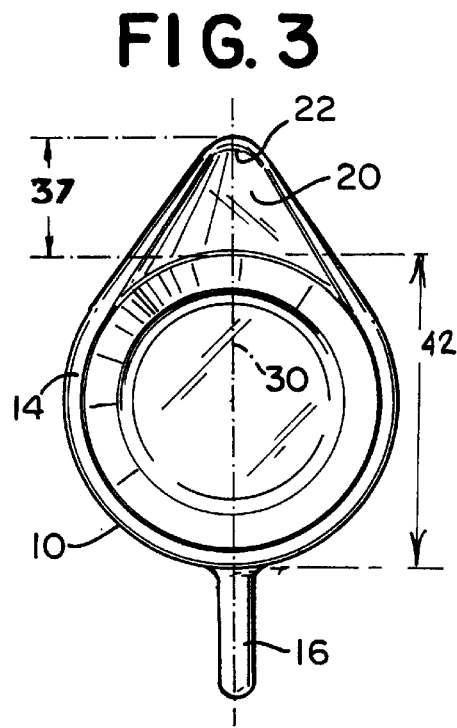

MEASURING AND DISPENSING DEVICE

FIELD OF THE INVENTION

The present invention is directed to improvements in measuring and dispensing devices, especially those which are suitable for the measuring and dispensing of comestibles.

BACKGROUND OF THE INVENTION

Measuring and dispensing devices of the type generally know as "measuring cups" are ubiquitous. They are widely used in culinary environments, in food and other processing environments and in industrial settings, in laboratory applications and otherwise. They are commonly made out of a wide range of material such as glass, plastic, metal, rubber, and other materials. Such devices either have indicia for indicating volumetric measurement, one sized to indicate such measurement, or are used as approximate measures and for convenience in dispensing.

SUMMARY OF THE INVENTION

The present invention is directed to improvements in measuring and dispensing devices, especially towards improvements in the delivery of material contained within such devices into other containers, onto work surfaces, and otherwise.

BRIEF DESCRIPTION OF THE DRAWINGS

FIG. 1 is a perspective depiction of a measuring-dispensing device in accordance with one preferred embodiment of the present invention.

FIG. 2 is a side elevation of the embodiment of FIG. 1.

FIG. 3 is an overhead view of the same, preferred embodiment.

The measuring cup has an ancient history; it has been little changed over the many years of its use. Conventionally, such objects comprise a container body having a handle or a modification to facilitate handling. Such objects generally comprise wall portions surrounding a bottom together with a top surface of the wall portions. The top, walls and bottom form the material holding portion of the container or the "container body". Such containers are generally provided with a lip or spout which facilitates the pouring of the contents of the container onto a work surface, into a work bowl or vessel or otherwise dispensing the same.

The foregoing arrangement, while suitable for many uses, has certain significant shortcomings. For example, when material is to be transferred from a measuring cup into another vessel where the other vessel has limited access space or where that vessel is encumbered by operating equipment, the delivery of the contents of the measuring cup is rendered difficult. For example, a measuring cup filled with flour frequently must be added to the work bowl of an electric mixer while the mixer is in operation. This is a commonplace occurrence in culinary establishments such as restaurants and residential kitchens. The operation of the mixer and the limited clearance at the top of the work bowl of such mixer makes access to the interior of the work bowl very difficult. It is frequently the case that flour or other material is spilled with ensuing mess, incomplete addition, and inconvenience. There is simply insufficient clearance to permit the contents to be transferred easily, accurately and under control.

At least one approach has been undertaken to solve this problem. Thus, certain shields have been devised which fit around the top of the work bowl, at least some of which have access spouts or slides, such that flour or other material to be added can be slid into the work bowl without the necessity of the measuring cup's coming into close proximity with the operating equipment. This, however is inconvenient, expensive, and gives rise to additional objects which must cleaned attendant to the cooking process.

The present invention provides improvements to measuring cups of this kind which permits the easy and straight-forward transfer of the contents of the cup into the work bowl of an electric mixer and similar devices while reducing or eliminating mess and inaccuracy and without sacrificing control. Such devices also find utility in industrial and food processing operations in general and, indeed, are suitable for the delivery and/or measuring of a host of materials in commerce. It is particularly useful in the culinary environment, however, and the dispensing of comestibles such as flour, meal, sugar, edible liquids and the like are particularly preferred in connection with the present invention.

In accordance with the invention, a measuring cup is provided, especially one which is adapted for the measuring and delivery of comestibles. In the context of the present invention the term "measuring cup" is used to as a common term one well-understood by persons of ordinary skill in the art. It will be understood that it is not necessary that the devices of the present invention actually comprise indicia of measurement in order for them to be within the spirit of the invention. Thus, while it is preferred that measuring indicia e.g., cups, liters, etc., be indicated on the devices of the present invention, such devices may also simply comprised fixed, known volumes or, indeed, simply be a convenient way for the transfer of material from one container into another without measuring the same.

In any event, such measuring cups generally comprise a container body and handle. The container body comprises wall portions which cooperate with a bottom in order to form a watertight container. The upper portions of the walls form a top surface of the body portion. The walls are preferably, generally cylindrical or somewhat conical in geometry although square, rectangular, pentagonal, or indeed irregular geometries could be employed if desired. Additionally, the handle, while conventional, convenient, and preferred, is not essential, and measuring cups in accordance with the invention will find utility without handle portions.

When a handle is employed, it is preferably of the "free standing" variety, that is, one that is attached to the body portion but which arches away from it in order to provide a convenient place for gripping by the human hand. Other handle portions, such as recessed detents in a body portion itself, may also be provided within the spirit of the present invention. Bails, such as those used for pails and the like may also be provided as may other forms of controlling the motion and stability of the containers of the present invention.

In accordance with the invention, a snout is provided projecting upwardly from the top surface of the body portion and outwardly from the wall portion of the container body which is preferably, generally opposite the handle, if such handle provided. It can be seen that the snout is an extension of the top portion and also of the wall portion and that the same is configured so as to provide a smooth transition from the interior of the container body to the snout itself. The outward extremity of the snout is denominated a lip. The snouts of the present invention are distinguished from the drip lips provided in prior measuring cups in terms of their size and general disposition. Thus, rather than providing a relatively small means for dispensing liquids from the interior of the measuring cups reducing drips, the function provided by the drip lip--, the present snouts are relatively large. Such snouts are adapted to serve as a funnel for the contents of the measuring cup, especially one which is capable of funneling solid contents of the container, e.g., flour, sugar, meal, etc., over the lip at the outward end of the snout and into the work bowl of a mixer or other container or like surface. By providing this relatively large protuberance the container body of the measuring cup is kept relatively remote from the limited access space generally found at the top of mixing devices and the like in culinary establishments. Easy delivery of the contents of the containers of the present invention into restricted openings as described hereinabove can, be accomplished.

In order to further distinguish the containers of the present invention from commonplace measuring cups known herebefore, reference is made to the drawings.

FIG. 1 depicts a measuring cup or container comprising a container body, 10 and, in this embodiment, a handle, 16. The container body has a wall portion 12 generally opposite the handle together with a top surface 14 of the body portion. Integral with the top surface is a snout 20 projecting upwardly from the top surface and outwardly from the wall portion 12 generally opposite the handle. The distal end of the snout forms a tip or lip 22. In the embodiment shown, indicia for measuring volume 18, are also provided.

FIG. 2 is a side elevation of the container of FIG. 1. The plane of the top surface 14 is shown generally as 30. The plane of the wall portion 12 generally opposite the handle or in any event, that wall portion from which the snout projects, is shown, 34. The extension of the snout above the plane of the top surface, 30 is shown as 32 which is a line parallel with the plane of the top surface 30 passing through the lip 22 of the snout. The distance between the lines 30 an 32 is the upward projection of the snout and is denominated 33. The outward projection of the snout from line 34 is depicted by line 36 which is a line parallel with line 34 but passing through the tip 22. The distance of this outward projection is depicted as 37.

FIG. 3 depicts the outward projection 37 from an overhead point of view.

The containers of the present invention are characterized in that the upward projection 33 of the snout is in a dimension of at least about 3 inches from the plane of the top surface 30 while the outward projection 37 is greater than about 2 inches in dimension measured from plane 34. Stated alternatively, dimension 33 is at least about 3 inches while dimension 37 is at least about 2 inches. It will be appreciated that a wide variety of sizes may be employed in conjunction with the present invention. Thus, measuring cups as small as ½ cup may be devised employing the invention as may container as large as 4 cups, a gallon, and even larger. For some applications, the dimensions 33 and 37 can be even larger than they presently are and, indeed, their ratio may be altered. It will appreciated by persons of ordinary skill in the art that determination and reliance upon the measurements 33 and 37 is employed in order to distinguish snouts such as are depicted here from drip lips found in common measuring cups.

As will be apparent to persons of ordinary skill in the art, the relative "largeness" of the snouts of the present invention are in comparison with the overall dimension of the containers from which the snouts project. In the context of this invention, the relative largeness gives rise to a difference in utility, not just an incremental difference in degree. Thus, the containers of this invention may be used differently ad for different purposes from those of the prior art. While, for common measuring cups of the kind found in residential kitchens and the like, the foregoing dimension of 3 inches and 2 inches respectively for dimensions 33 and 37 provide an indication of the approximate dimension of such snouts. It will be understood that "largeness" as applied to the snouts of the present invention is relative such that a relatively "large" snout on a small container, such as one containing ½ cup of liquid or solid or the like, could actually have smaller dimensions than those given above. Moreover, snouts appended to containers containing one, two, or even more gallons of material may very well be benefitted from larger dimensions than those given above. In order to make clear the generality of the present invention, there is an alternative way of distinguishing containers having snouts as presently contemplated from the relatively small drip lips of prior devices. Thus, in accordance with certain embodiments, the upward dimension of the snout, 33 should be at least about ⅓ of the dimension the plane found at the bottom of the container, 31 on FIG. 2, and plane 30 at the top of the container. This dimension is shown at 40 in FIG. 2. In other words, in accordance with certain preferred embodiments, dimension 33 should be at least about ⅓ of dimension 40. It is preferred that dimension 33 be at least about 40% of dimension 40 and even more preferred that the same be approximately ½ of dimension 40.

At the same time, the outward extension of the snout, 37, should be at least about 25% of the width of the container at the top surface of the container wall portions. In FIG. 2, this dimension is taken at the top surface 30 between planes 34 and 35 as shown. It is preferred that dimension 37 be at least 30% of the value of dimension 42 while it is even more preferred that the same be about ⅓ or even greater than the dimension 42.

It is preferred that the containers of the present invention be formed as a single unit, although it is possible to provide snouts which can be dismounted from the container body as a whole. Thus, it is preferred that the containers be either formed from metal through casting, forming, machining and the like or, and preferably, be formed from plastic. Any means for forming plastic such a s molding, forming, blow molding, vacuum forming, and the like may be profitably employed in connection with the present invention. While formation of unitary structures is preferred, it is possible to join together several different structures to form the overall container of the present invention, such as by gluing or otherwise fastening snouts, handles and body portions together in any convenient relationship.

It is, of course, preferred for comestible use, that the materials forming the containers of the present invention be consistent with food use, such that the same is preferably metal, glass, polycarbonate, or other food-safe plastic material. For industrial use, greater latitude may be employed.

It is preferred that the containers of the present invention be configured such that the snout projects smoothly from the top surface and from the wall portion so as to form a spatulate upwardly facing, concave surface having a smooth transition from the interior of the container body to the surface of the snout. This smooth transition facilitates the controlled, efficient transfer of materials from the interior of the container to other locations in containers.

Other aspects of the invention shall be apparent during review of the present specification and claims and all such falling within the spirit of the invention are comprehended hereby.

What is claimed is:

1. A container for delivery of comestibles comprising:
   a container body having a wall portion and a top surface and, integral with said top surface of said container body and, forming a unitary structure with said container body,
   a snout projecting upwardly from said top surface and outwardly from the wall portion; the upward projection of said snout extending at least about three inches above the plane of said top surface and measuring at least one-third of the upward dimension of the container body;
   said outward projection extending at least about two inches from the plane of the wall portion from which it extends and having a dimension at least thirty percent of the diameter of said container body at its top surface;
   the snout projecting smoothly from said top surface to form a spatulate, upwardly-facing concave surface having a smooth transition from the interior surface of the container body.

2. The container of claim 1 further comprising a handle generally opposite from said snout with respect to the container body.

3. The container of claim 1 further comprising indicia for indicating volume of the container body.

4. The container of claim 1 wherein said upward and outward projections are about equal.

5. The container of claim 1 wherein said upward projection extends at least about four inches.

6. The container of claim 1 wherein said outward projection extends at least about three inches.

7. The container of claim 1 formed from glass, metal or plastic.

* * * * *